United States Patent [19]
McClenahan et al.

[11] Patent Number: 5,489,983
[45] Date of Patent: Feb. 6, 1996

[54] SENSOR FOR VEHICLE ALIGNMENT SYSTEM AND APPARATUS USING SAME

[75] Inventors: James W. McClenahan, Florissant, Mo.; Leigh R. Burns, Jr., Troy, Ill.; Michael T. Stieff, Wentzville; Daniel B. January, St. Peters, both of Mo.

[73] Assignee: Hunter Engineering Company, Bridgeton, Mo.

[21] Appl. No.: 429,680

[22] Filed: Apr. 27, 1995

Related U.S. Application Data

[62] Division of Ser. No. 162,452, Dec. 2, 1993.

[51] Int. Cl.$^6$ .............................. G01B 11/26; G01B 5/24; G01C 1/00; H01J 40/14
[52] U.S. Cl. .................. 356/139.09; 250/214 B; 33/203.15; 33/203.18; 33/288; 356/141.3; 356/155; 356/152.1
[58] Field of Search ............................ 33/203.15, 203.18, 33/288; 356/139.09, 141.3, 155, 152.1; 250/214 B

[56] References Cited

U.S. PATENT DOCUMENTS

| | | |
|---|---|---|
| 3,778,128 | 12/1973 | Hannan . |
| 4,154,531 | 5/1979 | Roberts, Jr. et al. .................... 356/152 |
| 4,257,703 | 3/1981 | Goodrich ..................................... 356/4 |
| 4,302,104 | 11/1981 | Hunter ..................................... 356/152 |
| 4,311,386 | 1/1982 | Coetsier ................................... 356/155 |
| 4,319,838 | 3/1982 | Grossman et al. ....................... 356/152 |
| 4,336,658 | 6/1983 | January et al. ............................. 33/288 |
| 5,018,853 | 5/1991 | Hechel et al. ............................ 356/155 |
| 5,168,632 | 12/1992 | Rimlinger, Jr. ............................. 33/288 |
| 5,208,647 | 5/1993 | Longa et al. ............................. 356/152 |

*Primary Examiner*—Stephen C. Buczinski
*Attorney, Agent, or Firm*—Polster, Lieder, Woodruff & Lucchesi

[57] ABSTRACT

A system for measuring angular relationships of wheels of a vehicle includes a radiation source mounted with respect to a first wheel for providing a radiation signal, an image detector having an active array of pixels mounted with respect to a second wheel for receiving an image from the radiation source and for producing an output in response to the radiation signal, and a radiation detector disposed in the path of the radiation from the radiation source for detecting the presence of the radiation signal. A controller is responsive to the presence of the radiation signal to activate the image detector to receive the image from the radiation source and determine an alignment angle of a wheel of the vehicle from the output of the image detector. A mask is mounted between the radiation source and the detector for defining an image of the radiation source upon the detector, the mask preferably having at least three slits therein. The system also uses radiation signals and the active pixel array detector to electronically determine wheel base and/or track width and corrects alignment characteristic values for errors which are affected by wheelbase. The system also uses such radiation signals and detectors to electronically determine ride height and/or wheel offset distances.

36 Claims, 5 Drawing Sheets

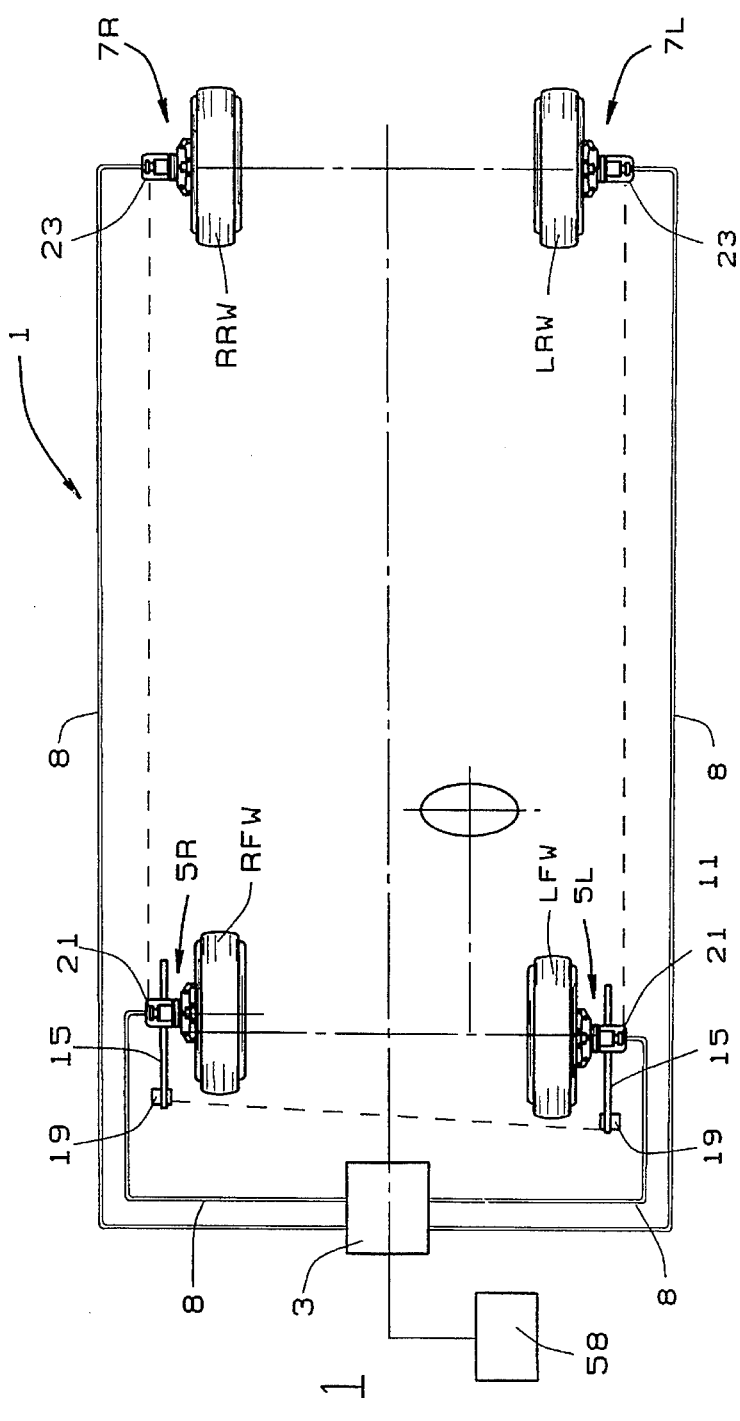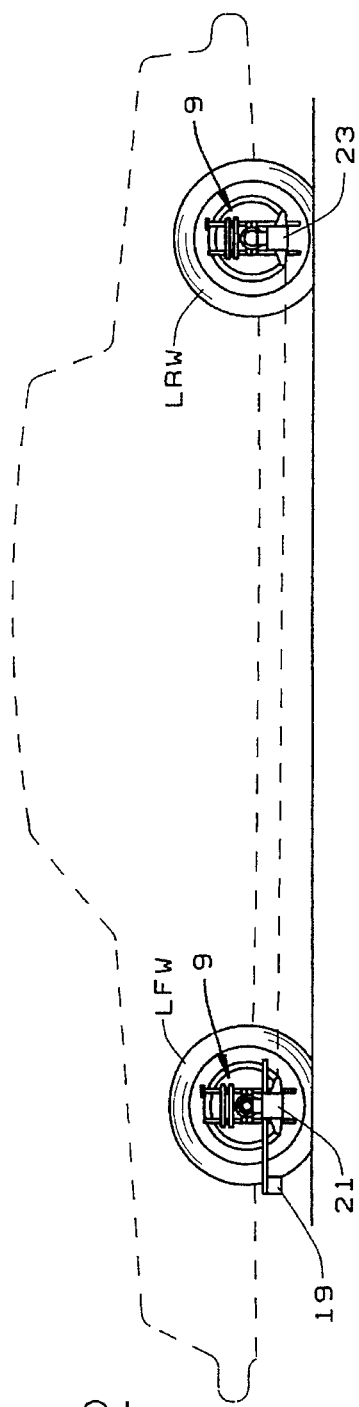

SENSOR FOR VEHICLE ALIGNMENT SYSTEM AND APPARATUS USING SAME

This is a divisional of application Ser. No. 08/162,452 filed on Dec. 2, 1993.

BACKGROUND OF THE INVENTION

This invention relates to vehicle wheel alignment systems, and in particular to sensors in a vehicle wheel alignment system which include an active pixel array detector, such as a charge injection device (CID), diode array, or charge coupled device (CCD) array.

Proper alignment of wheels in a vehicle is important for proper handling of the vehicle and proper tire wear. The alignment of a vehicle's wheels is performed primarily by adjusting camber, caster, steering axis inclination (SAI) and toe. Other suspension problems may be detected by examining vehicle ride height (a measure of vertical vehicle body position with respect to some reference such as the ground or a vehicle wheel) and wheel offset distances (a measure of relative horizontal vehicle body position with respect to the vehicle wheels).

It is known that alignment angles may be measured by placing sensor heads on each wheel of the vehicle to form pairs which extend across the front of the vehicle and along each side of the vehicle. Each sensor head has an emitter and a receiver. A sensor head emits a signal which is transmitted to the receiver of the other sensor head of that pair. The receiver converts this signal into a value which is indicative of the corresponding alignment angle of the vehicle. The signal presently used in these sensor heads is in the electromagnetic spectrum at the visual or infrared wavelengths (hereinafter, referred to as light). The light impinges upon a sensing device in the receiver whose output is representative of the measured angle.

Currently, photodiodes, as set forth in U.S. Pat. No. 4,302,104, which is incorporated herein by reference, and linear array type charge coupled devices (CCDs), as set forth in U.S. Pat. No. 5,018,853, are used as the receiver. Each of these devices has inherent limiting factors which affect their suitability for use as detectors in a vehicle wheel alignment system.

The photodiode array has a number of large active areas arranged in a linear array. The angle of the incident light beam is determined by taking the ratio of signals on two adjacent elements of the array. Because the elements are large, the aperture opening has a correspondingly large area. Under certain conditions, diffuse and/or reflected beams can enter the sensor and bias the angular readings. This occurs when a reflected beam and the directly radiated beam are coincident on the array, but their energies are centered at different points. The reflection cannot be identified (and thereby rejected) by the electronics because the large photodiode uses all the energy that is incident upon it (direct and reflected) to produce a signal. Because the reflection cannot be eliminated, a false reading, and hence a wrong angle, will be produced.

The CCD array incorporates many more active elements than the diode array, and those elements are much smaller than the diode array elements. As a result, spatial resolution with a CCD array is greatly enhanced and reflected beams that are co-incident in time but not position with the main beam can be identified and separated before the angle is determined. Problems can still be caused, however, by reflected signals if they are large in amplitude and impinge close to the main beam. These high amplitude signals can lead to signal overload and "blooming." To control blooming, a complex series of controls is needed. Phase interference (speckle) can also occur which distorts the direct beam energy pattern and consequently biases the computed angle. In addition, the reflected beam can cause an over-exposed condition on one or more pixels in the CCD. This will mask the location of the energy peak and no angle can be calculated until the exposure is corrected.

Conventional alignment angle sensors typically have the receiver and emitter in each head positioned close to the axis of the wheel on which they are mounted. But due to mechanical constraints, either the emitter or the receiver may be placed on the axis, but often not both. Errors may be induced into alignment angle measurements due to the off-axis placement. These errors, moreover, are a function of vehicle wheelbase. The wheelbase, however, may not be readily or easily available using prior art systems.

With respect to ride height and wheel offset measurements, it is known to use various mechanical or electro-mechanical devices to determine ride height and/or wheel offset distances. These devices, however, could be improved.

SUMMARY OF THE INVENTION

Among the various objects and features of the present invention may be noted the provision of an improved sensor for detecting alignment and suspension measurements.

A second object is to provide such a sensor which will accurately determine vehicle wheel alignment and steering angles.

A third object is to provide such a sensor which eliminates any need for control of the emitter portion of the sensor by the system controller.

A fourth object is to provide a wheel alignment system which corrects errors affected by off-axis placement of sensor emitters and/or detectors.

A fifth object is to provide a wheel alignment system which corrects errors affected by the wheelbase of the vehicle under test.

A sixth object is to provide a wheel alignment system which automatically and accurately determines vehicle wheelbase base and track width.

A seventh object is to provide a wheel alignment system which reliably determines vehicle ride height without mechanically moving parts.

An eighth object is to provide a wheel alignment system which reliably determines wheel offset distances without mechanically moving parts.

These and other objects will become apparent to those skilled in the art in light of the following disclosure and accompanying drawings.

Briefly, in a first aspect of the present invention, a system for measuring angular relationships of wheels of a vehicle includes a first unit for attachment to a first wheel of a vehicle, a second unit for attachment to a second wheel of a vehicle, and a radiation source mounted on the first unit for providing a radiation signal. An image detector is mounted on the second unit for receiving an image from the radiation source and for producing an output in response to the radiation signal. A radiation detector is disposed in the path of the radiation from the radiation source for detecting the presence of the radiation signal. A controller is operatively connected to the radiation detector for determining therefrom the presence of the radiation signal, the controller being responsive to the presence of the radiation signal to activate the image detector to receive the image from the radiation source. The controller is operatively connected to the image detector for controlling the image detector, for receiving the image detector output, and for determining an alignment angle of a wheel of the vehicle therefrom.

In a second aspect of the present invention, a method of measuring angular relationships of wheels of a vehicle includes the steps of providing a radiation signal from a radiation source, which signal travels generally from a first wheel to a second wheel of a vehicle, receiving an image from the radiation source in an image detector and producing an output in response to the radiation signal, detecting the presence of the radiation signal by means of a radiation detector independently of receiving the radiation source image, activating the image detector to receive the image from the radiation source in response to the detection of the radiation signal by the radiation detector, and determining an alignment angle of a wheel of the vehicle from the output of the image detector.

In a third aspect of the present invention a system for measuring an angular relationship of wheels of a vehicle includes a first head unit for attachment to a first wheel, a second head unit for attachment to a second wheel, a radiation source mounted on the first head unit for providing an image, and a detector mounted on the second head unit for receiving the image from the radiation source and providing an output representative of the image. A mask is mounted on the second head unit and interposed in a plane between the radiation source and the detector for defining an image of the radiation source upon the detector, the mask defining at least three slits therein. A controller is connected to the detector for receiving the detector output and in response providing an output representative of an angle of a wheel of the vehicle.

In a fourth aspect of the present invention, a receiver for a signal emitted by a light source is adapted to be mounted in fixed geometrical relationship to a first vehicle wheel. The light source is adapted to be mounted in fixed geometrical relationship to a second vehicle wheel. The receiver includes a mask having three or more slits or lenses through which the signal passes and a sensor having a plurality of arranged pixels positioned behind the mask.

In a fifth aspect of the present invention, a vehicle wheel alignment system includes a first sensor unit adapted to be removably mounted to a front wheel of a vehicle whose alignment is to be tested and a second sensor unit adapted to be removably mounted to a rear wheel of the vehicle under test such that the front wheel and the rear wheel are disposed on the same side of the vehicle. The first and second sensor units obtain wheel alignment data for their respective wheels. A controller determines wheel alignment characteristics of the front and rear wheels from the wheel alignment data from the first and second sensor units. At least one of the first and second sensor units has an active pixel array detector, the active pixel array detector providing the wheel alignment data for the sensor unit. The first and second sensor units include structure, including at least one radiation source, for projecting at least two spatially separated images upon the active pixel array detector, the spatial separation of the two images being a function of the wheelbase (or track width) of the vehicle under test. The controller is responsive to the active pixel array detector to determine the wheelbase of the vehicle under test from the spatial separation of the images on the active pixel array detector.

In a sixth aspect of the present invention, a method of determining wheelbase includes the steps of removably securing at least a first radiation source to a first wheel of a vehicle, removably securing an active pixel array detector to a second wheel of the vehicle, the distance between the first radiation source and the detector defining a wheelbase of the vehicle, and projecting a pair of images upon the active pixel array detector. The images are spatially separated a distance which is a function of the wheelbase and at least one of the images originates at the first radiation source. The spatial separation of the images on the detector is electronically determined and the wheelbase is calculated therefrom.

In a seventh aspect of the present invention, a vehicle wheel alignment system includes a first sensor unit adapted to be removably mounted to a first wheel of a vehicle whose alignment is to be tested, and a second sensor unit adapted to be removably mounted to a second wheel of the vehicle under test, the first and second sensor units obtaining wheel alignment data for their respective wheels. A controller determines wheel alignment characteristics of the first and second wheels from the wheel alignment data from the first and second sensor units. At least one of the first and second sensor units has an active pixel array detector, the active pixel array detector providing the wheel alignment data for the sensor unit. The first and second sensor units including structure, including at least one radiation source, for projecting at least two spatially separated images upon the active pixel array detector, the spatial separation of the two images being a function of the distance between the first and second wheels. The controller is responsive to the active pixel array detector to determine the distance between the first and second wheels from the spatial separation of the images on the active pixel array detector.

In an eighth aspect of the present invention, a method of electronically determining distance between a pair of wheels on a vehicle includes the steps of removably securing at least a first radiation source to a first wheel of a vehicle, removably securing an active pixel array detector to a second wheel of the vehicle, and projecting a pair of images upon the active pixel array detector. The images are spatially separated a distance which is a function of the distance between the first and second wheels and at least one of the images originates at the first radiation source. The spatial separation of the images on the detector is electronically determined and the distance between the first and second wheels is calculated based upon that determination.

In a ninth aspect of the present invention, a method of correcting vehicle wheel alignment angles includes the steps of removably securing at least a first radiation source to a first wheel of a vehicle and removably securing an active pixel array detector to a second wheel of the vehicle. The detector has an output representative of the radiation from the radiation source falling thereon. The distance between the first radiation source and the detector defines the separation between wheels of the vehicle, which separation can represent wheelbase, track width, or transverse toe. For simplicity of discussion, specific reference will be made generally to wheelbase, although it should be understood that the same discussion applies to all three measurements. A pair of images are projected upon the active pixel array detector, the images being spatially separated a distance which is a function of the wheelbase. At least one of the images originates at the first radiation source. The spatial separation of the images on the detector are electronically determined and the wheelbase is calculated therefrom. At least one alignment characteristic is electronically determined from the output of the detector and the value of the alignment characteristic potentially includes an error which depends at least in part on the wheelbase of the vehicle. The value of the alignment characteristic is electronically corrected using the electronically determined wheelbase.

In a tenth aspect of the present invention, a method of correcting vehicle wheel alignment angles includes the steps of removably securing at least a first radiation source to a first wheel of a vehicle in a first predetermined position with respect to the first wheel and removably securing an active pixel array detector to a second wheel of the vehicle in a second predetermined position with respect to the second wheel. The detector has an output representative of the radiation from the radiation source falling thereon. The distance between the first radiation source and the detector defines a wheelbase of the vehicle. At least one of the first and second predetermined positions is offset from the axis of rotation of its respective wheel. A pair of images are projected upon the active pixel array detector, the images being spatially separated a distance which is a function of the wheelbase. At least one of the images originates at the first radiation source. The spatial separation of the images on the detector is electronically determined and the wheelbase is calculated therefrom. At least one alignment characteristic is electronically determining from the output of the detector. Any angular variation of the detector from a plane normal to the axis of the second wheel is also determined, the normal plane containing the radiation source. The determined alignment characteristic is electronically corrected taking into account the electronically determined wheelbase and the angular variation of the detector from the normal plane.

In an eleventh aspect of the present invention, a ride height determining system includes a first ride height unit adapted to be removably mounted in fixed geometrical relationship with respect to a wheel of a vehicle and a second ride height unit adapted to be removably mounted to a predetermined location on the body of the vehicle, the vertical distance between the first and second units being indicative of ride height of the vehicle. The system also includes an active pixel array detector and structure for projecting a radiation distribution on the detector, the radiation distribution having a pair of spatially separated peaks. The separation of the peaks in the radiation distribution is a function in part of the vertical distance between the first and second ride height units. One of the ride height units has the detector fixedly secured thereto, and the other of the ride height units has at least part of the projecting structure fixedly secured thereto. The detector supplies an output indicative of the radiation distribution falling on the detector. A controller is responsive to the output of the detector for determining the ride height of the vehicle from the separation of the peaks in the radiation distribution.

In a twelfth aspect of the present invention, a system for determining vehicle wheel offset distances includes a first offset unit adapted to be removably mounted in fixed geometrical relationship with respect to a wheel of a vehicle and a second offset unit adapted to be removably mounted to a predetermined location on the body of the vehicle. The horizontal distance between the first and second units is indicative of wheel offset distance of the wheel with respect to the vehicle body. The system also includes an active pixel array detector and structure for projecting a radiation distribution on the detector. One of the offset units has the detector fixedly secured thereto, and the other of the offset units has at least part of the projecting means fixedly secured thereto. The detector supplies an output indicative of the radiation distribution falling on the detector and the position of the radiation distribution with respect to a reference position. A controller is responsive to the output of the detector for determining the offset distance of the wheel with respect to the vehicle body from the position of the radiation distribution with respect to the reference position.

BRIEF DESCRIPTION OF THE DRAWINGS

FIG. 1 is a schematic plan view of an alignment apparatus of the present invention applied to a vehicle's wheels;

FIG. 2 is a side elevational view of a vehicle, shown in phantom, having aligner head units applied to its wheels;

Similar reference characters indicate similar parts throughout the several views of the drawings.

DESCRIPTION OF THE PREFERRED EMBODIMENT

Turning to FIG. 1, a wheel alignment system 1 of the present invention includes a main console having a microprocessor 3, left and right front head units 5L and 5R, and left and right rear head units 7L and 7R. Head units 5L and 5R and 7L and 7R are connected to microprocessor 3 by cables 8 or any other suitable communication channel such as radio or infrared. The head units are substantially similar to the head units described in U.S. Pat. No. 4,319,838 to Grossman et al., which is incorporated herein by reference. The head units are shown connected to an external microprocessor 3 or a digital signal processor (DSP). Although external microprocessor 3 may handle all the computational requirements of the present invention, it is preferred that additional microprocessors or DSPs 3 A (see FIG. 10) be placed in each head unit to perform part of the computations. The head units are mounted to the left front wheel LFW, the right front wheel RFW, the left rear wheel LRW, and the right rear wheel RRW of a vehicle to measure the vehicle's alignment parameters. The head units are supported on the wheels by supports 9 (see FIG. 2).

Figure 3:
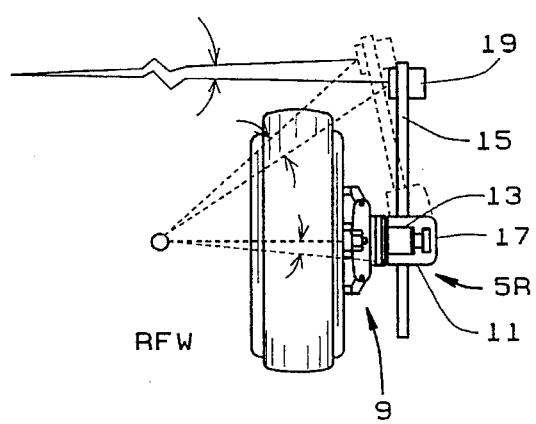
FIG. 3 is an enlarged plan view of a head unit applied to a steerable (front) wheel of the vehicle.

A front head unit is shown in more detail in FIG. 3. Each front head unit includes a housing 11, a sleeve 13 and an arm 15. (The rear head units are substantially similar to the front head units. The only significant difference is that the rear head units lack the arms 15.) Sleeve 13 mounts over a spindle of the corresponding support 9 to support the head unit. The head unit can swing freely about the spindle. The head unit can be positionally fixed by tightening a knob 17. A level (not shown) indicates when the unit is horizontally level. Once the head unit is leveled, knob 17 is tightened to hold the head unit in its level position.

The front head units each include two sensor units 19 and 21 (see FIG. 1). Each rear head unit includes one sensor unit 23. Each sensor unit includes a signal emitter 25 and a receiver 27 (see FIG. 4), each receiver being operatively connected through its associated microprocessor 3A to console microprocessor 3 via lines 8. As will become apparent, the emitters are not connected to microprocessor 3 or to the head unit microprocessors 3A. The sensor units operate in pairs, as set forth fully in the above noted U.S. Pat. No. 4,319,838, to determine the alignment angles for the vehicle tested.

Figure 4:
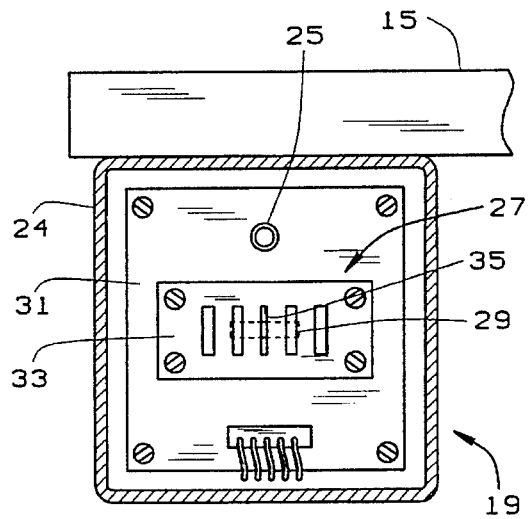
FIG. 4 is a front elevational view of an angle sensor of the present invention.
Figure 5:
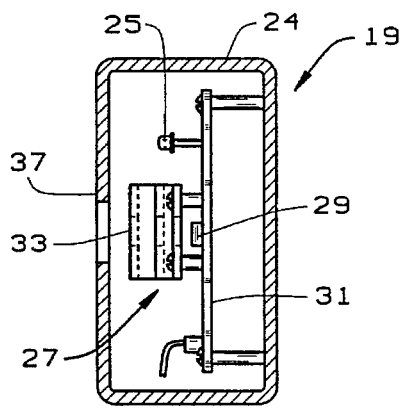
FIG. 5 is a side elevational view of the angle sensor.
Figure 6:
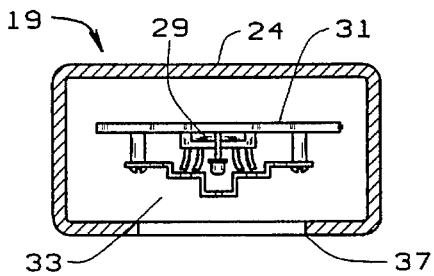
FIG. 6 is a top plan view of the angle sensor.

FIGS. 4–6 show a sensor unit in detail. Sensor units 19, 21, and 23 are identical and the sensor unit shown in FIGS. 4–6 has been indicated to be unit 19. Each sensor unit includes a housing 24 containing a signal source 25 and a signal receiver 27. Source 25 is preferably a light-emitting diode (LED). For clarity in illustrating the optical components, microprocessor 3A is not shown in FIGS. 4–6.

Figure 7:
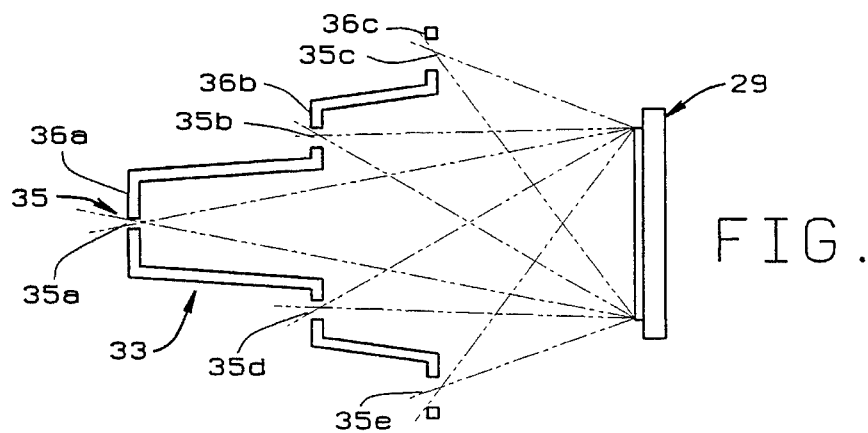
FIG. 7 is a cross-sectional view of a multiple slit mask of the present invention.

Receiver 27 includes a sensor 29 mounted on a PC board 31. Sensor 29 is an active pixel sensor, such as a CCD, a CID, a photodiode array, a double-gate floating surface transistor, a charge modulation device (CMD), a bulk charge modulated device (BCMD), a static induction transistor (SIT), a base-stored image sensor (BASIS), a microbolometer array, or an infrared (IR) sensor. Because of its availability and high resolution, the sensor is preferably a CCD. A mask 33 having one or more slits 35 is supported on PC board 31 spaced from CCD sensor 29. The mask is shown in FIG. 7 to have five slits 35a–e. Mask 33 defines three generally parallel planes or surfaces 36a–c on which slits 35a–e are formed. Surface 36a is furthest from CCD 29 and is centered with respect to CCD 29 and mask 33. Slit 35a is formed on surface 36a. Slits 35b and 35d are formed on surface 36b on opposite sides of slit 35a. Slits 35c and 35e are formed on surfaces 36c, again on opposite sides of slit 35a, and outwardly of slits 35b and d. The slits are of varying width—slit 35a is the narrowest and slits 35b–e progressively increase in size, slits 35c and 35e being the largest. However, any pattern of size increases can be used. Slits 35b–e are arranged symmetrically about slit 35a, in that the centers of slits 35b and 35d, and 35c and 35e are equidistant from the center of slit 35a. The center-to-center distance of between slits 35c and 35e is greater than the center-to-center distance between slits 35b and 35d. The slits thus form a triangular pattern. The center slit is farthest from CCD 29 and the other slit pairs get farther apart as they get closer to the CCD. Although a mask with five slits is shown, any desired number of slits greater than two could be used. A mask with three slits works well in the present invention. Moreover, the slits may be disposed on a rounded surface or a flat surface rather than the stepped surface shown in FIGS. 6 and 7.

A window 37 (FIG. 6) is formed in a wall of housing 24 to allow light from the opposite emitter 25 to reach and pass through mask 33 to impact upon CCD sensor 29. Sensor 29 is mounted to PC board 31 so that its longitudinal axis is generally horizontal. Slit 35 is formed in mask 33 to be generally vertical so that the slit is generally perpendicular to CCD sensor 29. Slits 35 allow a portion of the light from opposite light source emitter 25 of the sensor's pair to fall upon CCD sensor 29. The remaining portion of the light from light source 29 directed at the sensor is blocked by mask 33.

CCD sensor 29 consists of a plurality of pixels which may be arranged linearly or in an XY array. When light from opposite light source emitter 25 impinges upon CCD sensor 29, the individual pixels, which are impinged by the light, are charged to create "charge packets." Readout is accomplished by transferring or "shitting" the charge packets in a parallel fashion into a shift register where the packets are moved in sequence to the charge amplifier.

Figure 8:
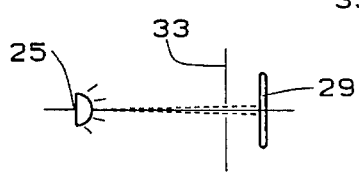
FIG. 8 is a diagram showing the angle of light entering the angle sensor for a vehicle having properly aligned wheels.
Figure 9:
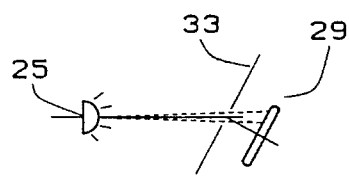
FIG. 9 is a diagram showing the angle of light entering the angle sensor for a vehicle having improperly aligned wheels.

FIG. 8 shows the relationship between light source 25 and sensor 29 at an angle of 0°. As can be seen, when the wheels are in alignment, the signal fails across the middle of sensor 29. FIG. 9 shows the relationship of light source 25 and sensor 29 when the wheels are not in proper alignment. As can be seen, when the wheels are not in alignment, the light signal does not fall across the middle of CCD sensor 29, but rather is displaced an amount corresponding to the angle to be measured.

When the receiving and transmitting heads are aligned, the energy passes through the central slit and impinges on the receiving array near the center. The energy passing through the adjacent slits would fall just outside the edges of the array. For small angles of movement about the aligned position, the energy coming through the central slit 35a would sweep along the array in proportion to the viewing angle of the head. Since the slit is a large distance from the array, a high resolution but limited range measurement can be achieved. When the viewing angle has exceeded the range of the central slit, the energy coming through an adjacent slit falls on the array. Measurements through this slit have an extended range with lower resolution. The number of slits, slit spacing, slit distanced from the sensor 29, and slit width can all be varied to achieve a desired range and resolution of an angular measurement.

As receiver 29 and emitter 25 are rotated relative to each other, the angle between receiver 29 and light source 25 is changed, and the line of light produced by slit 35 moves across the pixels of sensor 29. It should be understood that although the present invention is described as using slits to form the images, other optical elements such as lenses could also be used. At zero degrees, pixel elements near the center of CCD sensor 29 are illuminated (see FIG. 8). As the receiver is rotated, elements farther from the center of the sensor are illuminated. (FIG. 9). The relevant alignment angle is found by determining which of the pixels of sensor 29 are illuminated and calculating how far the angle is from zero degrees. As set forth above, this is done simply by scanning the pixels to determine which ones have been illuminated. For small angles, the angle measured is approximately proportional to the distance the illuminated pixels are from those pixels which are lighted at zero degrees (the actual relationship includes an arctangent function).

Figure 10:
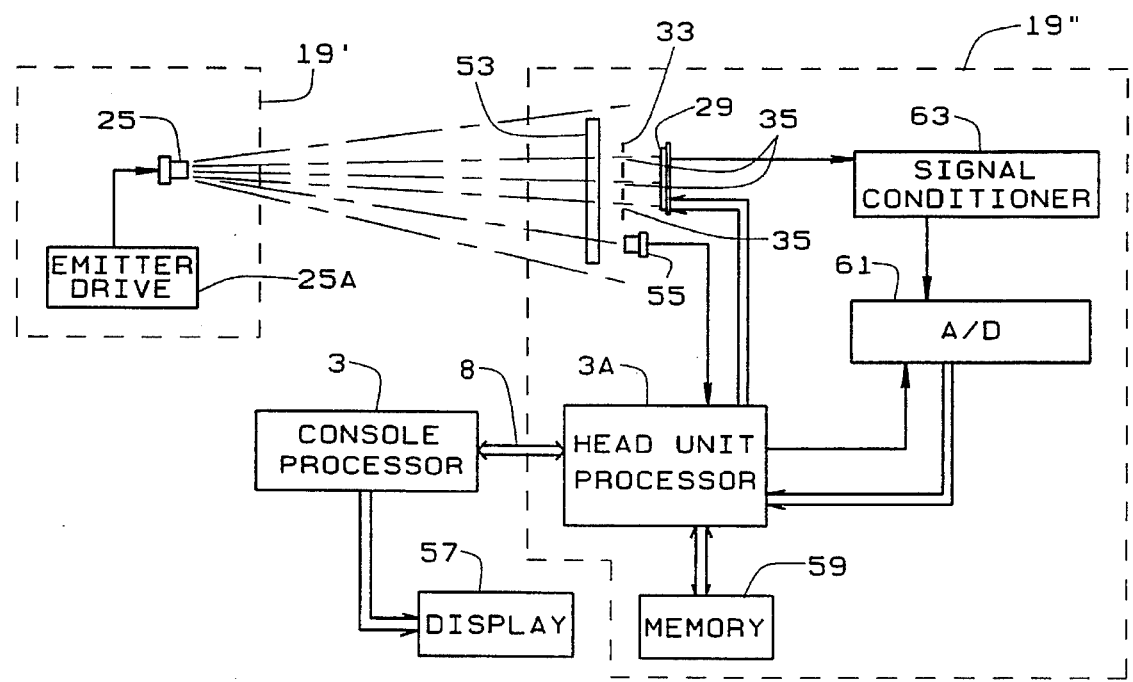
FIG. 10 is a block diagram of the circuitry of the alignment apparatus of FIG. 1.

FIG. 10 is a schematic block diagram of the circuitry of alignment system 1. For clarity only a single emitter/CCD sensor pair is shown, although it will be understood that each such pair if shown would function in the same manner. The emitter is physically disposed in one head unit, labeled 19', while the sensor is physically disposed in another head unit, labeled 19". Each emitter 25 has an emitter driver 25A which drives the output of the emitter as described below. The output of emitter 25 passes through an optional filter 53 to fall upon mask 35 and a radiation detector 55. Filter 53 is provided to minimize the effect of ambient light on the sensors. Radiation detector 55 is connected to its corresponding head unit microprocessor 3A (or any other suitable processor), which communicates via cable 8 to console microprocessor 3. Console microprocessor 3 in turn controls a console display 57, which is preferably a CRT type display.

As shown in FIG. 10, head unit microprocessor 3A is connected to a memory 59, and an analog-to-digital converter 61. It is also connected to CCD sensor 29 for the purposes of activating the sensor at the appropriate time and reading (through a conventional signal conditioning circuit 63 and ADC 61) the sensor output.

Emitter 25 and emitter driver 25A are totally independent of the various microprocessors and CCD sensor 29. The emitter is driven through a fixed cycle by driver 25A to provide a freewheeling or asynchronous (with respect to the microprocessors) output. The emitter output cycle consists of a modulated pulse to identify the start of the cycle, a rectangular pulse for exposure, and a differently modulated pulse for the end of the cycle, followed by a dark time. Radiation detector 55 identifies the start of the cycle and signals the corresponding head unit microprocessor 3A to turn on or activate the CCD sensor 29 for a trial exposure period. From this initial exposure, the optimum exposure time is calculated by the processor and performed on the next light cycle. An exposure of equal time is taken during the dark time of the cycle (when the emitter is off). The result from the dark time exposure is subtracted from the optimum exposure to cancel background noise. The data is then sent to microprocessor 3, where it is further processed and the result sent to display 57 for display to the user.

Specifically, microprocessor 3A applies a software driven algorithm to the digitized signal from ADC 61 and determines therefrom the location of the main beam. This location is subsequently converted to an angle and displayed on display 57. Display 57 may include a CRT, a printer, or both.

By narrowing the slit 35 of mask 33, the amount of light which passes through mask 35 will be reduced, thereby reducing the number of pixels illuminated. Down to a certain slit width, narrowing the slit will increase the accuracy of the angle determination by providing a more well defined beam location.

Because emitter 25 and detector 55 are not tied together, no feedback from the detector to the emitter driver is required to control exposure of the CCD sensor. No wire or communications link is needed between the sensors for the purpose of feedback control. Moreover, the presence of radiation detector 55 permits over-exposure and under-exposure conditions to be detected without using the CCD sensor 29. In addition, high background signals can be detected by radiation detector 55 independent of the CCD sensor.

Figure 11:
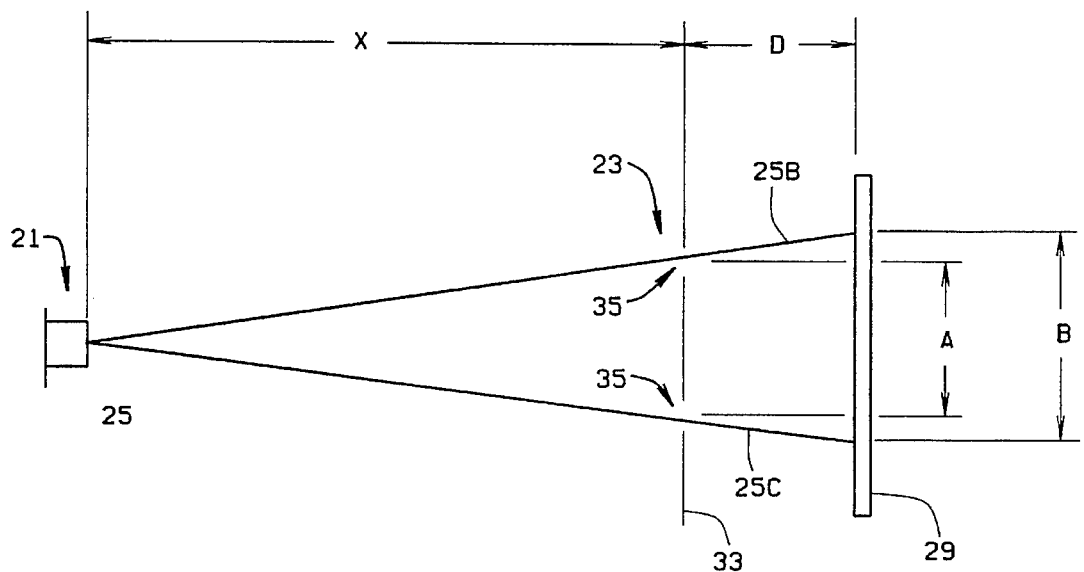
FIG. 11 is a schematic diagram illustrating the determination of vehicle wheelbase using the present invention.

Turning to FIG. 11, it can be seen how the present apparatus is used to electronically determine wheelbase. Although the present invention is described in terms of determining wheelbase, it should be understood that track width may be determined in exactly the same way except that sensor units 19 (which look across the front of the vehicle) are used instead of sensor units 21 and 23 (which look along each side of the vehicle). In general, the present invention determines the distance between wheels, which may be wheelbase or track width, depending upon the sensors being used. In addition, system 1 as described above preferably has a mask 33 with at least three slits, but only two slits are required in the mask to determine wheelbase (or track width).

For determining wheelbase, sensor units 21 and 23 are removably mounted to their respective wheels. For simplicity, only a single pair of sensor units 21 and 23 will be considered, although it should be understood that the sensor unit pairs on each side of the vehicle operate in the same way to determine wheelbase. Any difference in the wheelbases determined by the sensor unit pairs is noted by console microprocessor 3 and indicates a potential vehicle alignment problem, such as non-parallel axles.

Note that the measurement of wheelbase requires no different mounting than that required for obtaining wheel alignment data, so that the wheelbase determination is an integral part of the wheel alignment process. It requires no additional work on the part of the technician/user. The console microprocessor or controller determines the wheel alignment characteristics of the front and rear wheels from the wheel alignment data from sensor units 21 and 23 in exactly the same way as set forth above. The present apparatus is able to obtain additional information, wheelbase information, from those sensors as well. This is in part because the sensor detectors are active pixel array detectors, such as the CCD detectors described above. Actually, for purposes of determining wheelbase, it is only required that one of the detectors on each side of the vehicle be an active pixel array detector, configured as shown in FIG. 11. Since the emitters and detectors come in pairs (one for each sensor unit) in the configuration described above, either pair can be used to determine wheelbase. Alternatively, both pairs can be used and the wheelbase results for each pair manipulated (by averaging, etc.) to determine the wheelbase for those two particular wheels.

As can be seen in FIG. 11, emitter 25 projects radiation (preferably infrared light, although other frequencies could also be used) in a beam toward the mask 33 and CCD detector 29. For determining wheelbase it is preferred that mask 33 have two slits 35 disposed as shown. The central slit shown in FIGS. 4 and 10, for example, may also be present, but the corresponding output of detector 29 must be ignored by the processor in that circumstance. Algorithms to perform such central peak masking in software are known in the art and do not make up part of the present invention. For clarity of illustrating the principles of determining wheelbase, only the two slits 35 necessary for this purpose are shown in FIG. 11.

Emitter 25 in combination with the two slits 35 constitute means for projecting two spatially separated images upon detector 29. In practice the result is a pair of peaks on the detector disposed where the rays 25B and 25C strike the detector. The procedure for locating those peaks using a CCD linear array detector 29 is described in U.S. Pat. No. 5,018,853, which is incorporated herein by reference. The active pixel array detectors have the property that such peaks can be located, both relative to each other and relative to some arbitrary reference from the output of the detector. The output of detector 29, therefore, provides the distance "B" (the separation of the two peaks in the light distribution) to head unit microprocessor 3A. Note that this distance changes as the distance "X" between the two sensor units change. This distance "X" is the wheelbase of the vehicle, as measured for those two particular wheels to which sensor units 21 and 23 are attached. The other two distances shown on FIG. 1, namely "D" and "A" are fixed. Distance "D" is the distance between the mask 33 and detector 29 (this distance is not shown to scale in FIG. 11). Distance "A" is the distance between the two slits 35 in the mask.

From inspection of FIG. 11, and applying the law of similar triangles, it can be seen that A/X=B/(X+D). Solving for X gives X=(A*D)/(B−A). Since A and D are known, and B is the measured separation of the peaks, the microprocessor has all the information needed to determine wheelbase. It should be understood that since A and D might vary slightly from unit to unit, it would be desirable to perform initial calibration on the unit before the measurement of actual wheelbase.

Figure 12:
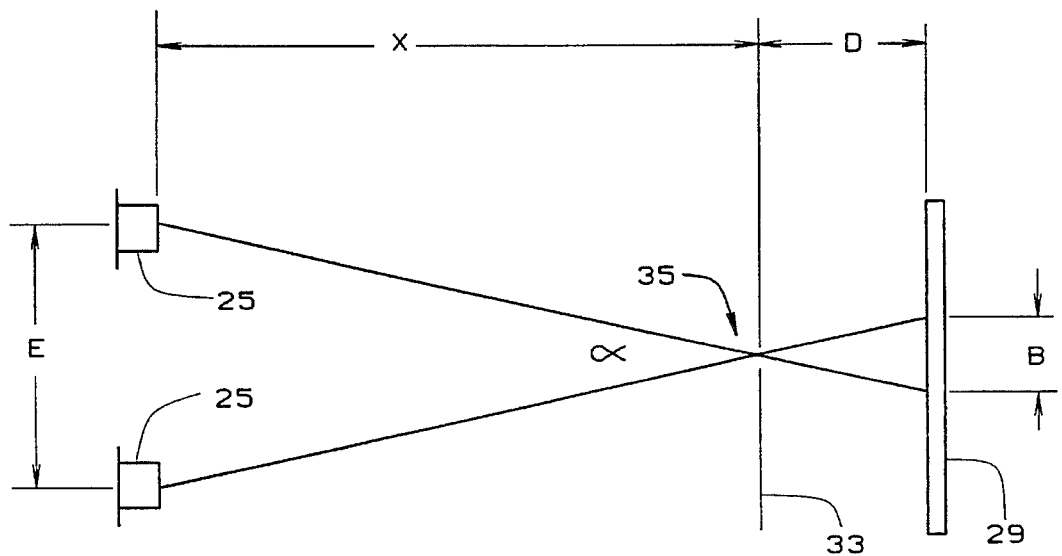
FIG. 12 is a view similar to FIG. 11 showing an alternative structure for obtaining vehicle wheelbase measurements.

Note that although a single emitter and a mask with two slits is shown for projecting a pair of radiation peaks on the detector, equivalently a pair of emitters and a mask with a single slit could be used instead. Of course, lenses could be used instead of the various slits described. Such a configuration is shown in FIG. 12. In this configuration, the distance "E" between the emitters 25 is known, as is distance "D," while the distance "B" between the two peaks is measured. Since X/E=D/B, the wheelbase with this configuration is X=(D*E)/B.

Figure 13:
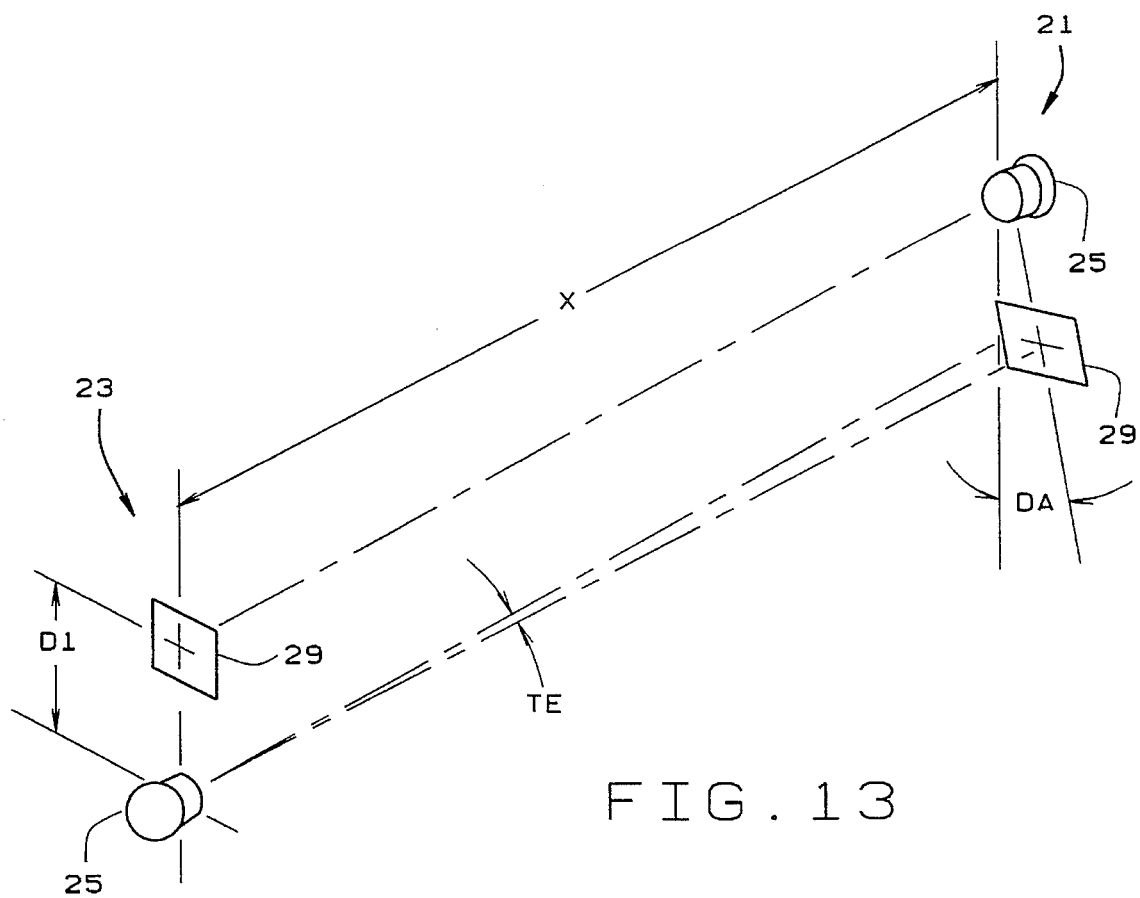
FIG. 13 is a perspective schematic illustrating an alignment measurement error whose magnitude is a function in part of wheelbase.

The electronically determined wheelbase is used by console microprocessor 3 in correcting certain alignment measurement errors which are, in part, a function of wheelbase. One such error is illustrated in FIG. 13. The measurement of rear toe of a vehicle can be affected by camber of the front wheel. This occurs because the axis of the front sensor unit 21 (which detects the rear toe angle) differs from the axis of the rear sensor unit 23 by the camber angle "CA." Note that the magnitude of the error is influenced by the fact that the front wheel detector 29 is disposed off the axis of rotation of the wheel. If both the emitter and detector were disposed on the axis of rotation of the wheel, small changes in camber would result in negligible effects on the placement of detector 29. With the configuration shown in FIG. 13, however, the error resulting from off axis placement of the front detector is small, but measurable.

As a result of the different sensor unit axes, the measured toe angle includes an error "TE" which is in part a function of the wheelbase, X (the distance between the rear wheel emitter 25 and the front wheel detector 29). The amplitude of this error is given by the equation $$\tan(TE)=(D1*\sin(CA))/X$$

where D1 is the distance between the rear emitter and detector. Since D1 is known, and the system measures CA and X, console microprocessor 3 is able to use the above equation to correct the measured rear toe angle using the electronically determined wheelbase. Of course the present invention is not limited to correcting rear toe. Any wheelbase dependent error in the measurements may be corrected by microprocessor 3 once the wheelbase is determined as set forth above.

Figure 14:
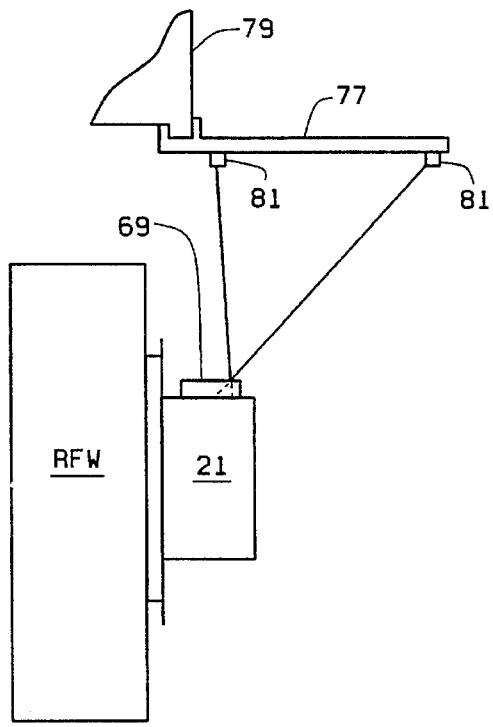
FIG. 14 is a simplified elevation of ride height and wheel offset measuring apparatus of the present invention mounted on a vehicle.
Figure 15:
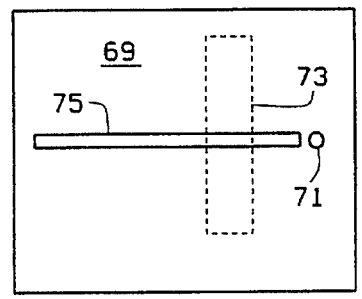
FIG. 15 is a top plan of a portion of the apparatus of FIG. 14.
Figure 16:
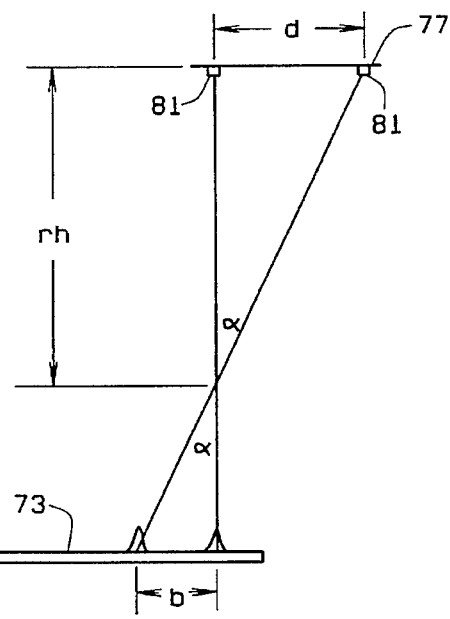
FIG. 16 is a schematic diagram illustrating the determination of ride height using the apparatus of FIG. 14.

Turning to FIG. 14, it can be seen that the present invention may also be used to determine vehicle ride height and wheel offset distances. This does require an additional piece of equipment. In FIG. 14, sensor unit 21 is shown removably mounted to a wheel (for purposes of illustration the right front wheel RFW). Sensor unit 21 has fixedly mounted thereto a ride height/offset sensor unit 69, which as will become apparent includes an emitter 71 (FIG. 15) and an active pixel array detector 73 (FIG. 16). More specifically, the ride height/offset sensor unit 69 has emitter 71 disposed on the top thereof, adjacent a slit 75 in the top of unit 69. The detector 73, which is preferably a linear CCD array detector, is disposed at the bottom of unit 69. Note that ride height/offset unit 69 is mounted in fixed geometrical relationship with respect to the wheel of the vehicle.

Emitter 71 is positioned so as to project illumination upwardly (as shown in FIG. 14) when sensor unit 21 is mounted on a vehicle wheel. The radiation (preferably infrared) projected by emitter 71 strikes a reflector unit 77 removably mounted by the technician/user on a fender 79 (or other suitable surface) of the vehicle. The vertical distance between ride height/offset unit 69 and reflector unit 77 is a measure of the ride height of the vehicle.

Reflector unit 77 holds in fixed known relative positions a pair of corner reflective cubes 81. Such cubes are known in the art and have the property of reflecting light directed at them back at the light source along a parallel path. Radiation from emitter 71, therefore, is directed upwardly toward the corner reflective cubes 81, which reflect that radiation back downwardly through slit 75 onto CCD detector 73.

Figure 17:
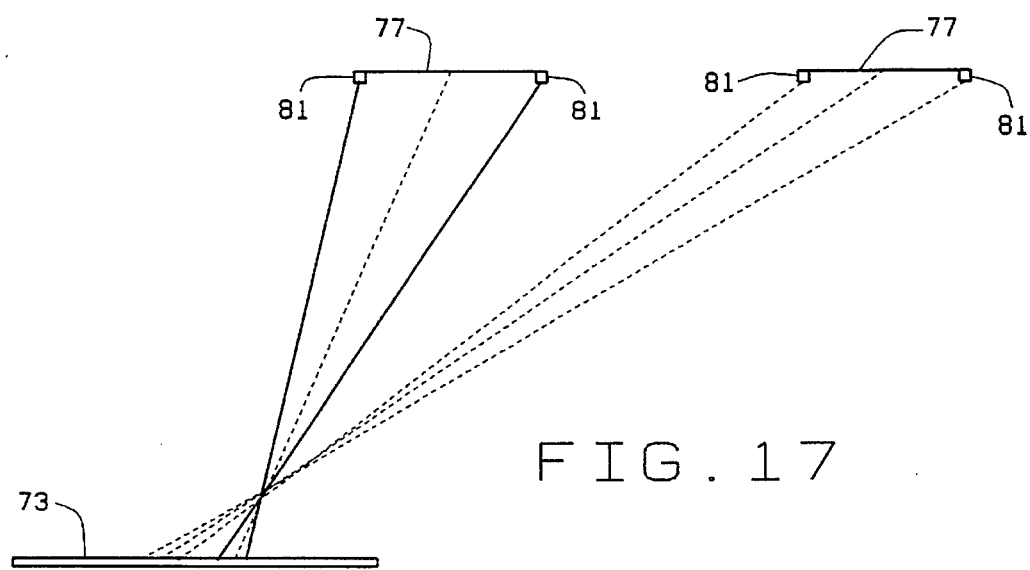
FIG. 17 is a schematic diagram illustrating the determination of wheel offset distance using the apparatus of FIG. 14.

Determination of ride height and wheel offset distance using units 69 and 77 is illustrated in FIGS. 16 and 17. In FIG. 16, the distance "rh" between slit 75 and the reflector unit is the ride height (or a distance differing from the ride height only by a known constant). The distance "d" is the spacing between the two corner reflective cubes 81 and is fixed and known.

The radiation directed by emitter 71 toward the cubes is reflected back to detector 73 where it forms the pair of separated peaks shown, which peaks in the detector output are separated by a distance "b". The distance "b" varies with ride height "rh." This distance between peaks is determined by microprocessor 3A, to which the output of detector 73 is supplied.

Although the ride height may be determined given the peak to peak distance "b" in a number of ways, it is preferred that it be determined by using a calibration constant. Reflector unit is held by a suitable jig at a fixed, known vertical distance, "rhcal", and at a fixed, known horizontal position with respect to detector 73. The output of detector 73 is examined by microprocessor 3 to find the calibration peak to peak distance, "bcal." Thereafter, the microprocessor determines the actual ride height by using the calibration measurement, bcal, and ride height calibration distance, rhcal, and the current peak to peak measurement, "b." The equation relating these quantities is $$rh=bcal*rhcal/b.$$

Many equivalent equations could also be used.

FIG. 17 illustrates the determination of wheel offset distance using the present apparatus. The horizontal position of reflector unit 77 with respect to the detector 73 is a measure of wheel offset distance. When the reflector unit is disposed in a position such as the leftmost one shown in FIG. 17, the reflected radiation falls on average to the right of the reflected radiation position when the reflector unit is disposed more to the right (see phantom drawing of reflector unit 77). That is, the absolute position of the radiation pattern on detector 73 is a measure of wheel offset distance. This absolute position is relatively easy to obtain since the output of the CCD detector array provides absolute position information with respect to an arbitrary reference position. The position of either peak, or the average of the positions of both peaks, or some other combination of the detector output may be used to measure wheel offset. It is preferred that microprocessor 3 determine the absolute position of each peak and then average the values to determine wheel offset, but any other method could be used as well.

During calibration, as described above, microprocessor 3 records the absolute position of the reflected radiation pattern to calibrate the wheel offset measurement. Subsequent readings of absolute position of the pattern are compared with the calibration position to determine actual wheel offset. It is preferred that the actual offset measurement be taken with the wheels steered straight ahead at the beginning of the alignment. Thereafter, reflector unit 77 may be removed by the technician/user while the rest of the alignment is performed. If it is desired to obtain continuous ride height measurements during the alignment, the reflector unit may be left in place.

It should be understood that the ride height and offset measurements may also be made using apparatus with two emitters in place of the two corner cubes, or using one emitter mounted to the vehicle fender and two slits over the CCD array, in a fashion similar to that described above in connection with wheelbase/track width measurements.

The foregoing description has been set forth for illustrative purposes only. Variations, within the scope of the appended claims, may be apparent to those skilled in the art.

What is claimed is:

1. A system for measuring angular relationships of wheels of a vehicle, comprising:
   a first unit for attachment to a first wheel of a vehicle;
   a second unit for attachment to a second wheel of a vehicle;
   a radiation source mounted on the first unit for providing a radiation signal;
   an image detector mounted on the second unit for receiving an image from the radiation source and for producing an output in response to the radiation signal;
   a radiation detector disposed in the path of the radiation from the radiation source for detecting the presence of the radiation signal;
   a controller operatively connected to the radiation detector for determining therefrom the presence of the radiation signal, said controller being responsive to the presence of the radiation signal to activate the image detector to receive the image from the radiation source, said controller being operatively connected to the image detector for controlling the image detector, for receiving the image detector output, and for determining an alignment angle of a wheel of the vehicle therefrom.

2. The system for measuring angular relationships of wheels of a vehicle as set forth in claim 1 wherein the radiation source includes a driver for driving the source to provide a fixed cycle of radiation output.

3. The system for measuring angular relationships of wheels of a vehicle as set forth in claim 2 wherein the driver includes means for driving the source such that the fixed cycle includes a modulated start pulse of radiation, the controller being responsive to the detection of said start pulse by the radiation detector to activate the image detector.

4. The system for measuring angular relationships of wheels of a vehicle as set forth in claim 3 wherein the controller is under programmed control to activate the image detector for a trial exposure period upon receipt of a start pulse from a first cycle of the radiation source output, said controller being responsive to the image detector output during the trial exposure period to determine an optimum exposure time for the image detector based upon the image detector output during the trial exposure period.

5. The system for measuring angular relationships of wheels of a vehicle as set forth in claim 4 wherein the controller is responsive to receipt of a start pulse from a second cycle of the radiation source output after the first cycle to activate the image detector for the optimum exposure time calculated by the controller from the output during the trial exposure period.

6. The system for measuring angular relationships of wheels of a vehicle as set forth in claim 2 wherein the driver includes means for driving the radiation source such that the fixed cycle of radiation output includes an exposure pulse of radiation.

7. The system for measuring angular relationships of wheels of a vehicle as set forth in claim 6 wherein the exposure pulse of radiation is rectangular.

8. The system for measuring angular relationships of wheels of a vehicle as set forth in claim 6 wherein the controller is under programmed control to calculate an optimum exposure time for the image detector, said exposure pulse being at least as long as the optimum exposure time.

9. The system for measuring angular relationships of wheels of a vehicle as set forth in claim 6 wherein the driver includes means for driving the radiation source such that the fixed cycle of radiation output includes a dark period at least as long as the exposure pulse.

10. The system for measuring angular relationships of wheels of a vehicle as set forth in claim 9 wherein the controller is responsive to the output of the image detector during the exposure pulse and during the dark period to cancel background noise from the output of the image detector.

11. The system for measuring angular relationships of wheels of a vehicle as set forth in claim 10 wherein the controller cancels background noise by subtracting a portion of the dark period output of the image detector from a portion of the exposure pulse output.

12. The system for measuring angular relationships of wheels of a vehicle as set forth in claim 2 wherein the driver includes means for driving the radiation source such that the fixed cycle of radiation output includes a modulated stop pulse of radiation.

13. The system for measuring angular relationships of wheels of a vehicle as set forth in claim 12 wherein the driver further includes means for driving the source such that the fixed cycle includes a modulated start pulse of radiation, the modulated stop pulse differing from the modulated start pulse.

14. The system for measuring angular relationships of wheels of a vehicle as set forth in claim 1 wherein the radiation source output is totally independent of the controller of the image detector.

15. The system for measuring angular relationships of wheels of a vehicle as set forth in claim 14 wherein the radiation source is free-wheeling.

16. The system for measuring angular relationships of wheels of a vehicle as set forth in claim 1 wherein the controller is responsive to the radiation detector output to detect an over-exposure condition.

17. The system for measuring angular relationships of wheels of a vehicle as set forth in claim 1 wherein the controller is responsive to the radiation detector output to detect an under-exposure condition.

18. The system for measuring angular relationships of wheels of a vehicle as set forth in claim 1 wherein the controller is responsive to the radiation detector output to detect a high background signal condition.

19. A method of measuring angular relationships of wheels of a vehicle, comprising:
   providing a radiation signal from a radiation source, said signal traveling generally from a first wheel to a second wheel of a vehicle;

receiving an image from the radiation source in an image detector and producing an output in response to the radiation signal;

detecting the presence of the radiation signal by means of a radiation detector independently of receiving the radiation source image;

activating the image detector to receive the image from the radiation source in response to the detection of the radiation signal by the radiation detector; and determining an alignment angle of a wheel of the vehicle from the output of the image detector.

20. The method of measuring angular relationships of wheels of a vehicle as set forth in claim 19 wherein the radiation signal has a fixed cycle of radiation output.

21. The method of measuring angular relationships of wheels of a vehicle as set forth in claim 20 wherein the fixed cycle includes a modulated start pulse of radiation, the image detector being activated in response to the detection of said start pulse by the radiation detector.

22. The method of measuring angular relationships of wheels of a vehicle as set forth in claim 21 including the step of activating the image detector for a trial exposure period upon receipt of a start pulse from a first cycle of the radiation source output, and determining an optimum exposure time for the image detector based upon the image detector output during the trial exposure period.

23. The method of measuring angular relationships of wheels of a vehicle as set forth in claim 22 including the step of activating the image detector for said determined optimum exposure time during at least one subsequent cycle of the radiation output.

24. The method of measuring angular relationships of wheels of a vehicle as set forth in claim 20 wherein the fixed cycle of radiation output includes an exposure pulse of radiation.

25. The method of measuring angular relationships of wheels of a vehicle as set forth in claim 24 wherein the exposure pulse of radiation is rectangular.

26. The method of measuring angular relationships of wheels of a vehicle as set forth in claim 24 further including determining an optimum exposure time for the image detector, said exposure pulse being at least as long as the optimum exposure time.

27. The method of measuring angular relationships of wheels of a vehicle as set forth in claim 24 wherein the fixed cycle of radiation output includes a dark period at least as long as the exposure pulse.

28. The method of measuring angular relationships of wheels of a vehicle as set forth in claim 27 further including using the output of the image detector during the exposure pulse and during the dark period to cancel background noise from the output of the image detector.

29. The method of measuring angular relationships of wheels of a vehicle as set forth in claim 28 wherein the background noise is canceled by subtracting a portion of the dark period output of the image detector from a portion of the exposure pulse output.

30. The method of measuring angular relationships of wheels of a vehicle as set forth in claim 20 wherein the fixed cycle of radiation output includes a modulated stop pulse of radiation.

31. The method of measuring angular relationships of wheels of a vehicle as set forth in claim 30 wherein the fixed cycle includes a modulated start pulse of radiation, the modulated stop pulse differing from the modulated start pulse.

32. The method of measuring angular relationships of wheels of a vehicle as set forth in claim 19 wherein the radiation source output is totally independent of the image detector.

33. The method of measuring angular relationships of wheels of a vehicle as set forth in claim 32 wherein the radiation source is free-wheeling.

34. The method of measuring angular relationships of wheels of a vehicle as set forth in claim 19 including the step of detecting an over-exposure condition independently of the image detector.

35. The method of measuring angular relationships of wheels of a vehicle as set forth in claim 19 including the step of detecting an under-exposure condition independently of the image detector.

36. The method of measuring angular relationships of wheels of a vehicle as set forth in claim 19 including the step of detecting a high background signal condition independently of the image detector.

* * * * *